C. POTTRATZ.
SEPARATOR FOR STORAGE BATTERIES.
APPLICATION FILED DEC. 18, 1920.
1,410,595.
Patented Mar. 28, 1922.
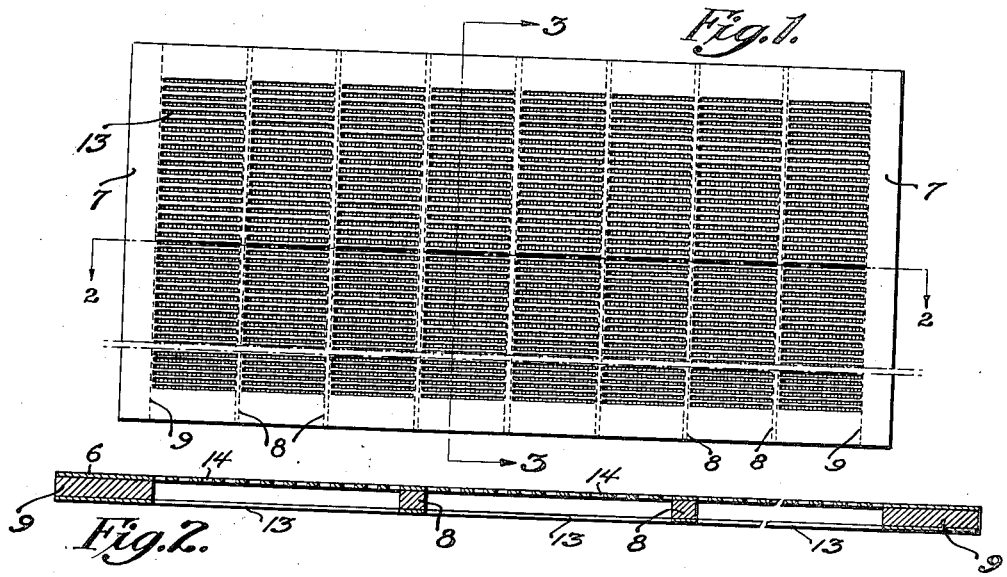
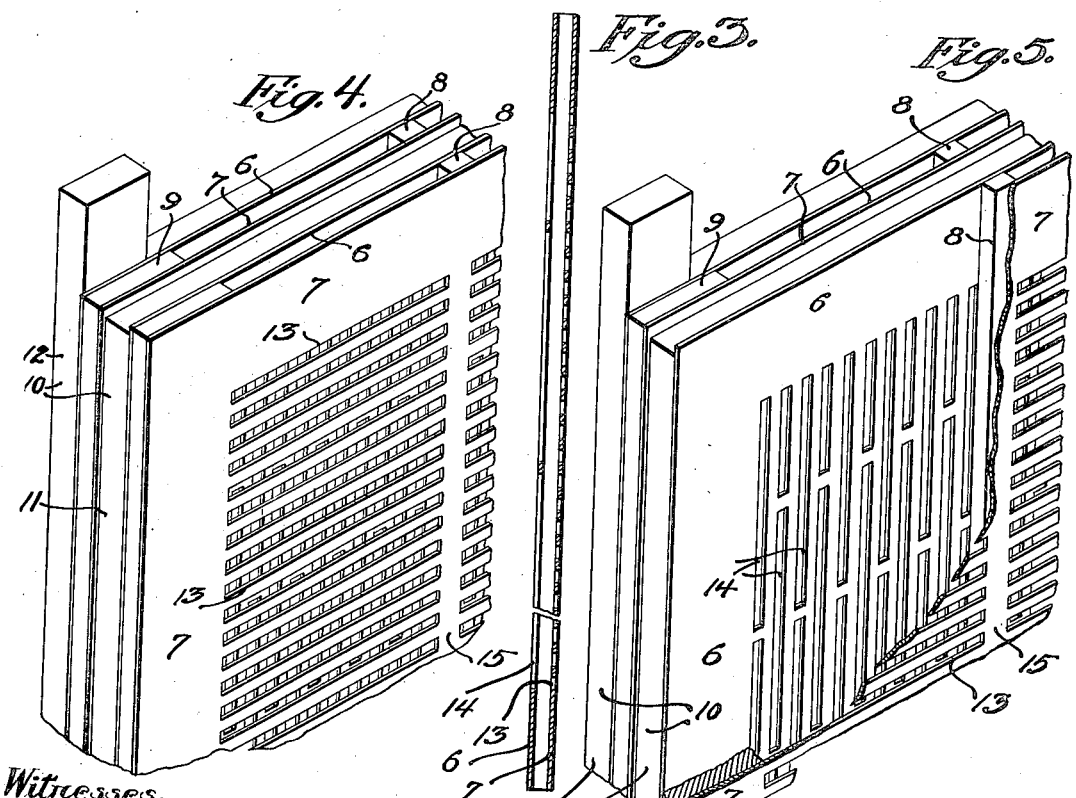

UNITED STATES PATENT OFFICE.

CHARLES POTTRATZ, OF PHILADELPHIA, PENNSYLVANIA, ASSIGNOR OF ONE-HALF TO ASHTON R. POWELL, OF HATBORO, PENNSYLVANIA.

SEPARATOR FOR STORAGE BATTERIES.

1,410,595.  Specification of Letters Patent.  Patented Mar. 28, 1922.

Application filed December 18, 1920. Serial No. 431,543.

*To all whom it may concern:*

Be it known that I, CHARLES POTTRATZ, a citizen of the United States, residing at Philadelphia, in the county of Philadelphia and State of Pennsylvania, have invented certain new and useful Improvements in Separators for Storage Batteries, of which the following is a specification.

It is well known that in commercial electric storage batteries, such as used in automobiles for the purpose of effecting the ignition, etc., the separators between the positive and negative plates often "break down" causing the plates to be polarized or short circuited. Also said positive and negative plates have a tendency during use to warp adjacent their upright edges and unless the separators are capable of withstanding this warping action without "breaking down" the metals of the plates will contact and incapacitate the battery.

One object of my present invention is to provide a separator which will overcome or prevent the above noted objectional conditions.

Another object is to make my improved separator of a structure which can be readily manufactured.

These objects, and other advantageous ends which will be described hereinafter, I attain in the following manner, reference being had to the accompanying drawings in which—

Figure 1 is a front elevation of a separator made in accordance with my invention, Figure 2 is an enlarged sectional plan view taken on the line 2—2 of Figure 1 with a portion of the length of the separator broken away, Figure 3 is an enlarged section taken on the line 3—3 of Figure 1, Figure 4 is a fragmentary perspective view showing the arrangement of my improved separator with respect to positive and negative plates of a storage battery as they set within the casing; the casing not being illustrated, and Figure 5 is a view of the same general character as that shown in Figure 4 with one side of the separator broken away to reveal the structure of the separator.

Referring to the drawing, my improved separator is made of material such for example as hard rubber and includes two sheets or thin plates 6 and 7 which are preferably rectangular and of the same dimensions. These sheets are spaced apart and are joined together by upright ribs 8; said ribs being spaced apart within the length of the separator as clearly shown in Figures 1 and 2. These ribs may be either made separately from the plates and cemented or otherwise secured to the sheets 6 and 7 or they may be made integral with said sheets. The upright edge portions of the separators are secured together by upright partition strips 9 which are preferably made much wider than the ribs 8 as clearly shown in the sectional view in Figure 2. Thus in the finished structure of the separator the partition strips 9, upon any attempt of the upright edge portions 10 of the positive and negative plates 11 and 12 to warp or bend out of the proper alignment, serve to efficiently prevent said warping of the edge portions of the positive and negative plates and thereby prevent said plates from working through the separators.

The sheet 7 of the separator has horizontally extending slots 13 which are opposite and communicate with the spaces between the ribs 8 and between the end partition strips 9 and the adjacent ribs 8; the other sheet 6 having upright slots 14 which communicate with the spaces between said ribs 8 and between the end partition strips 9 and the adjacent ribs 8 so that if any metallic particles attempt to pass transversely from one plate to another, their transverse passage will be ordinarily interrupted due to the transverse portions of the material of the sheets between the slots. Also by having spaces provided between the sheets from top to bottom, such particles have a chance to pass downwardly between the sheets to the bottom of the casing of the battery. The sheet 7 is so constructed that the slots 13 do not extend across the ribs 8 and in this manner the structure is reinforced since the portions 15 of the sheet 7 are unbroken and are secured directly to the ribs 8.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A separator of the character described including two sheets of material spaced apart and having ribs secured to said sheets and dividing the space between the sheets into upright channels, said sheets respectively having elongated slots therein communicating with said channels between the ribs, the slots in one sheet extending at an angle to the length of the slots in the other sheet; substantially as described.

2. A separator of the character described including two sheets of material spaced apart and having ribs secured to said sheets and dividing the space between the sheets, said sheets each having elongated slots therein communicating with the spaces between said ribs and between the sheets, said sheets being secured together adjacent their upright edge portions by comparatively wide end partition strips positioned therebetween and serving as rigid means when interposed between the positive and negative plates of a storage battery; substantially as described.

In testimony whereof I have signed my name to this specification in the presence of two subscribing witnesses.

CHARLES POTTRATZ.

Witnesses:
ELIZABETH GARBE,
CHAS. E. POTTS.